June 14, 1949.　　　　　C. E. PLOUFF　　　　　2,473,072
LINE DISPENSING CONTAINER
Filed March 11, 1946

INVENTOR.
Clifford E. Plouff
BY
Reynolds & Beach
ATTORNEYS

Patented June 14, 1949

2,473,072

UNITED STATES PATENT OFFICE 2,473,072

LINE DISPENSING CONTAINER

Clifford E. Plouff, Seahurst, Wash., assignor, by mesne assignments, to Pacific Manufacturing & Engineering Corp., Seattle, Wash., a corporation of Washington Application March 11, 1946, Serial No. 653,580

7 Claims. (Cl. 242—142)

The present invention concerns a casing or container for a line or lines, from which such lengths of the line as are required for immediate use can be withdrawn as required, and readily severed from that remaining within the casing. Such a line container may afford a supply of line of almost any sort, but has been especially designed for the use of fishermen, and to contain a supply of leader or similar line.

The usual fishing kit contains many small and easily entangled items in a small tackle box or other container. Leader line is supplied in lengths, in envelopes, or in loose loops, and when simply placed within the fishing kit, or hurriedly restored thereinto, quickly becomes entangled with other items; being of a nature tending to uncoil, it is difficult to keep in order, and to cut off from the supply such length as is needed. Moreover, in order to cut off a length, the fisherman must produce a knife, open it, cut off the desired length, close the knife, and restore it to his pocket, or to the kit, where it is one more item to find and to keep in order in the crowded kit box.

It is an object of the present invention to provide a container or casing of small compass, capable of containing an ample supply of leader, of different strengths, so shaped that it is easy to find and to handle, yet not likely to become entangled with other gear within the case. It is another important object, in conjunction with the object just expressed, to provide such a casing with self-contained means for cutting or snipping off the desired length of line, so that no other cutting means are required.

It is, also, an object to provide a casing of the general character indicated, which can be made of any suitable material such as folded plastic material, or aluminum, to be light, simple, and inexpensive, yet rugged.

With the above and other objects in mind, as will appear as this specification progresses, the invention comprises the novel parts and the novel combination and arrangement of such parts, as is shown in the accompanying drawings in a presently preferred form, and as will appear more fully in this specification, and in the claims which form a part thereof.

Figure 1:
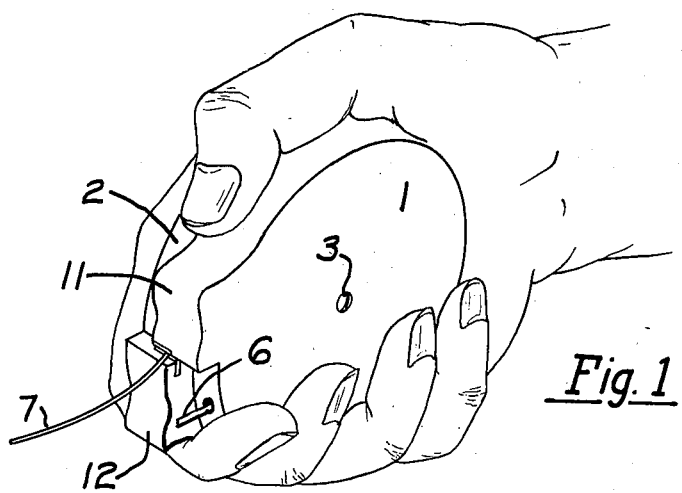
Figure 1 is a perspective view of the present invention, shown with the parts in the positions they would occupy during the operation of severing a length of leader from the supply stored within the casing.
Figures 2, 3:
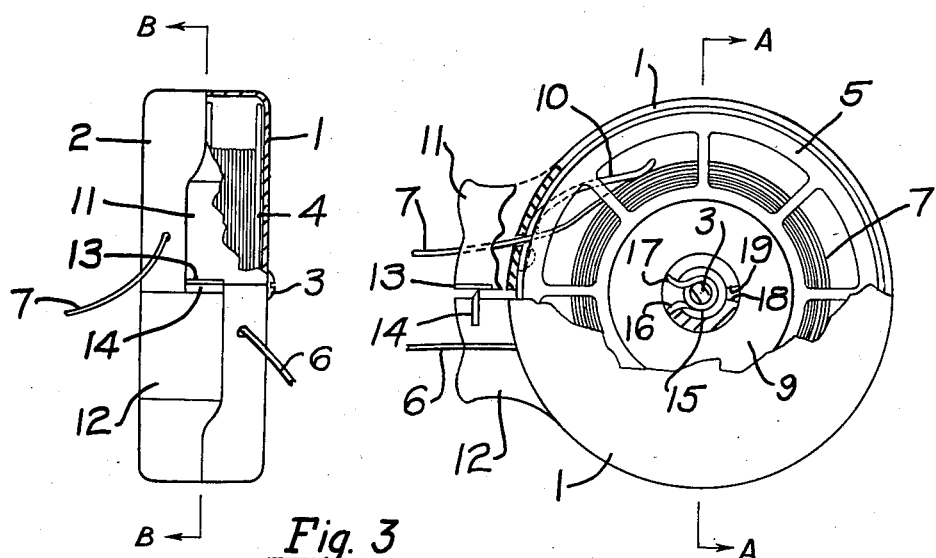
Figure 2 is a side elevation of the casing, and Figure 3 an edge view thereof, with parts in the same snipping position, both views being broken away, and the line of section of part of Figure 2 being indicated approximately by the line B—B of Figure 3.
Figure 4:
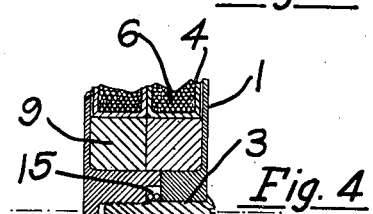
Figure 4 is a detail axial section through the central portion of the casing, the line of section being indicated by the line A—A of Figure 2.

The invention is best embodied in a two-part casing shaped to contain one or more reels (two, as herein shown) of leader or other line, with the two parts relatively movable and provided with cooperating cutting or snipping means capable of being brought together, with the leader line between them, to snip off such length of the leader as has been withdrawn from the contained reel, for use. Preferably, the two casing parts are resiliently urged apart, or more correctly, are resiliently urged in such relative senses as to spread apart the snipping members, so that the latter stand apart, ready to receive between them a further length when more is required.

To illustrate, the casing in the embodiment shown in the drawings consists of two opposed, cup-shaped halves, 1 and 2, joined by and relatively oscillatable about an axially disposed pin 3, threaded into one half and holding the other half thereto. Internally, each half provides an annular recess, about its hub and within its rim, of a size to contain a narrow reel 4 or 5, whereon is wound leader line 6 or 7. The free end of each leader exits through a small hole in its casing half, provided for the purpose. The center of the recess in each half may be filled with an adapter bushing, 8 or 9, respectively, about which its reel may rotate. Individual spring drags, such as that shown at 10, prevent undue unreeling of the line, but permit it to be withdrawn readily, as needed, merely by a pull on the protruding end.

The two halves 1 and 2 are formed, exteriorly, with radially projecting lugs 11 and 12, respectively. In assembly, and by means which will shortly be described in detail, they are located close together. Their adjacent surfaces are formed as or provided with cutting or snipping elements, which cooperate to sever a line held therebetween. For example, the lug 11 has a flat anvil-like plate 13, and the lug 12 carries an edged plate 14 disposed to press against the plate 13. The respectively distant surfaces of the two lugs are shaped conveniently to be pressed by the thumb and first finger of the user's hand, in the manner shown in Figure 1, for the purpose of pressing the snipping elements 13 and 14 together.

The snipping elements 13 and 14 should normally stand apart, so that the leader line may easily be disposed in snipping position therebetween. A coil spring 15, surrounding the pin 3, and engaging the respective shoulders 16 and 17 formed upon the hubs of the two halves 1 and 2, serves this purpose. Other shoulders 18 and 19 on the same hubs, respectively, limit the oscillatory movement of the two halves related to one another, and the separation of the snipping elements 13 and 14, under the influence of the spring 15.

It is believed that the operation of the device, and its utility, will be obvious. When a length of leader is required, the casing is obtained from the tackle box, and one or the other protruding end, according to the strength of leader desired, is pulled out to the desired length. It is held between the snipping elements 13 and 14, which are spring-held apart, and then by pressing the lugs 11 and 12 together, the snipping elements sever the withdrawn length of line. Upon releasing the lugs, they move apart under the influence of the spring, and the casing may be replaced within the tackle box. Never is any appreciable length of leader left protruding, to become entangled with other gear, and always the supply of leader is kept neatly, ready for use.

It will be understood that the snipping means shown have been chosen as illustrative, though they are presently preferred, and shearing or other cooperative cutting means might be substituted therefor, if desired. If the "line" to be dispensed takes the form of a ribbon or tape of paper or the like, the snipping elements may be primarily clamping means, to hold the tape against being pulled out, while it is being torn off across the serrated edge of one such element. Such elements are known per se, but not in conjunction with a casing formed and arranged as herein described. Likewise, the cup-like form of the casing halves is only one of various suitable forms, to contain the leader supply, and yet to permit separation and approach in the course of snipping operations. Such departures from the form shown and particularly described are to be understood as within the intended scope of this invention, to the extent indicated by the following claims.

I claim as my invention:

1. A container for line, comprising two parts complementally shaped to contain such a line, means joining said parts for limited relative movement about a common, centrally disposed axis, a pair of complemental snipping elements, one carried by each container part, and means reacting between said two complemental parts, yieldably urging said complemental snipping elements apart, said snipping elements upon approach being relatively disposed to snip a line interposed therebetween.

2. A container for a reeled line, comprising two container parts complementally shaped to contain a reel, means joining said parts for limited relative rotational movement about the reel's axis, a pair of complemental snipping elements, one carried by each container part, and means reacting between said two complemental parts, yieldably urging said snipping elements apart, but permitting them to come into contact to snip a line from the reel, if interposed therebetween.

3. A container for a reeled line, comprising two like circular cups complementally shaped to contain a reel, an axially disposed pin joining said cups for relative rotational movement, stop means carried by each cup, and interengageable to limit such rotational movement, said cups having overlapping lugs outstanding from their respective peripheries, complemental snipping elements mounted in said lugs for engagement, or limited separation, and spring means interposed between said cups to urge the snipping means apart.

4. A container for a reeled line, comprising two like circular cups complementally shaped to contain a reel, an axially disposed pin joining said cups for relative rotational movement, stop means carried by each cup, and interengageable to limit such rotational movement, said cups having overlapping lugs outstanding from their respective peripheries, complemental snipping elements mounted in said lugs for engagement, or limited separation, and spring means interposed between said cups to urge the snipping means apart, and each lug having a finger-engaging portion whereby the snipping means may be urged into contact to snip a line from the reel within, if interposed therebetween.

5. A container for a reeled line or the like comprising two substantially identical coaxially disposed circular cups meeting along a plane perpendicular to their common axis, pivot means joining said two cups for relative rotational movement, two cooperative snipping elements, one carried by each cup, disposed relatively to engage and to sever a line issuing from the container, upon relative rotational movement of the cups, and a like lug outstanding from each cup for engagement by the thumb and a finger to press the snipping elements into snipping relationship.

6. A container for a reeled line or the like comprising two substantially identical coaxially disposed circular cups meeting along a plane perpendicular to their common axis, pivot means joining said two cups for relative rotational movement, two cooperative snipping elements, one carried by each cup, disposed relatively to engage and to sever a line issuing from the container, upon relative rotational movement of the cups, a like lug outstanding from each cup for engagement by the thumb and a finger to press the snipping elements into snipping relationship, resilient means normally holding such snipping elements apart, for ready interposition of the issuing line, and like stop means upon each cup, projecting past their meeting plane, and disposed to retain the snipping elements normally in slightly spaced-apart position.

7. A container for a line, comprising two parts complementally shaped to encase a line, at least one of said parts having an outer rim and reel means formed internally thereof to define, conjunctively with the rim of said part, an annular line cavity, means journalling together said parts for relative rotation about a common axis, cutter elements mounted cooperably, one on each of said parts, for relative separation, and for approach into position to sever a line disposed therebetween by relative movement of said parts, resilient means reacting between said parts, yieldingly urging said cutter elements apart, and a line exit leading from said cavity directly through said rim.

CLIFFORD E. PLOUFF.

REFERENCES CITED

The following references are of record in the file of this patent:

UNITED STATES PATENTS

| Number | Name | Date |
| --- | --- | --- |
| 2,276,414 | Morehouse et al. | Mar. 17, 1942 |
| 2,310,522 | Gorbatenko | Feb. 9, 1943 |
| 2,351,781 | Punte | June 20, 1944 |

FOREIGN PATENTS

| Number | Country | Date |
| --- | --- | --- |
| 287,667 | Great Britain | Mar. 29, 1929 |